Dec. 1, 1970

R. D. BROWN ET AL  3,544,233

TURBINE NOZZLE CHAMBER SUPPORT ARRANGEMENT

Filed July 29, 1968  2 Sheets-Sheet 1

INVENTORS
Ralph D. Brown &
Ernest K. Johnson
BY
*Frank Quinn Jr.*

United States Patent Office 3,544,233
Patented Dec. 1, 1970

3,544,233
TURBINE NOZZLE CHAMBER SUPPORT
ARRANGEMENT
Ralph D. Brown, Springfield, and Ernest K. Johnson, Newtown Square, Pa., assignors to Westinghouse Electric Corporation, Pittsburgh, Pa., a corporation of Pennsylvania
Filed July 29, 1968, Ser. No. 748,462
Int. Cl. F01d 25/28
U.S. Cl. 415—126                            8 Claims

ABSTRACT OF THE DISCLOSURE

In an elastic fluid turbine, two inlet nozzle chamber structures, one upper and one lower, are fastened together and to the cylinder or casing of the turbine so as to permit differential thermal expansion to take place between all three parts while also dampening any vibration in the chambers that could result from the elastic fluid excitation, if any clearance exists between guide members and the chambers at the vertical centerline of the turbine.

BACKGROUND OF THE INVENTION

This invention relates, generally, to elastic fluid turbines and, more particularly, to an arrangement for supporting inlet nozzle chambers in a turbine cylinder or casing.

In a turbine which operates at a high temperature, it is necessary to provide for expansion between components of the turbine structure, such as inlet nozzle chambers consisting of two 180° segments, one upper and one lower, fastened together and connected to the turbine casing to permit admission of the elastic fluid to the first stage blading of the turbine.

An object of this invention is to provide for supporting and fastening two inlet nozzle chambers together and to the cylinder or casing of a turbine in a manner to permit differential thermal expansion to take place between all three parts without internal stress.

Another object of the invention is to provide for substantially dampening vibration that could take place between the casing and the chambers at the vertical centerline of the turbine.

Other objects of the invention will be explained fully hereinafter or will be apparent to those skilled in the art.

SUMMARY OF THE INVENTION

In accordance with one embodiment of the invention, within a turbine casing, upper and lower nozzle chamber structures of semicircular extent are juxtaposed to provide an annular array of chambers and two support plates are provided at opposite sides of the nozzle chambers and fastened to the upper and lower chambers and to the turbine cylinder or casing so that a clearance is maintained between the chambers at the horizontal joint. At least one plate is flexible in a direction to permit differential thermal expansion to take place between all three parts. The relative location of the vertical centerlines of the chambers and the casing are maintained by guide members located in the casing cover and in the base. Vibration is dampened by making one support plate more flexible than the other so that when thermal expansion of the chambers takes place during operation, there is a resulting constant bias or force exerted on the sides of the guide members facing the support having the lesser amount of flexibility.

BRIEF DESCRIPTION OF THE DRAWINGS

For a better understanding of the nature and objects of the invention, reference may be had to the following detailed description, taken in conjunction with the accompanying drawings, in which.

DESCRIPTION OF PREFERRED EMBODIMENT

Figure 1:
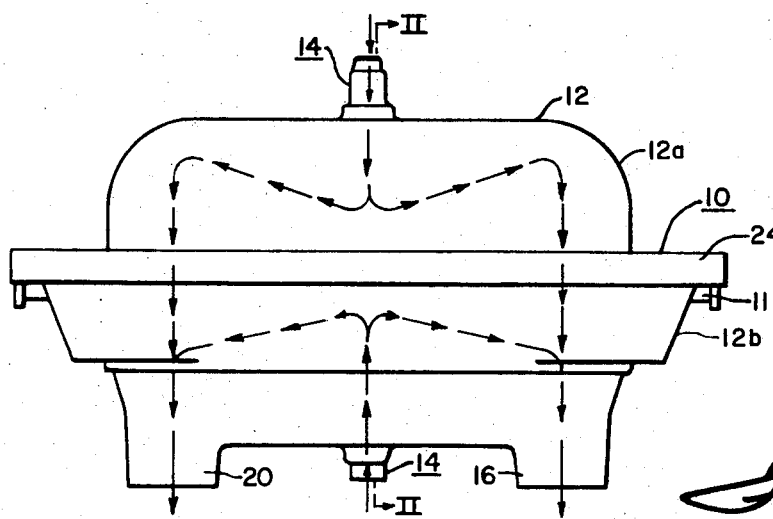
FIG. 1 is an outline view, in longitudinal elevation of a turbine embodying principal features of the invention.

Referring to the drawings, and particularly to FIG. 1, there is shown a turbine 10 having a rotor shaft 11 rotatably mounted in a generally tubular casing 12. The turbine shown is of the central admission double-flow type in which (as indicated by the dot-dashed arrows) a hot pressurized elastic motive fluid enters the turbine casing through a set of inlet openings 14 and flows axially in opposite directions through two sets of turbine blades (not shown), and is thence directed through outlet openings 16 and 20 in at least a partially expanded condition. However, the present invention may be utilized with turbines of other types, such as a single-flow turbine in which the elastic fluid flows through the turbine past one set of blades and in only one direction.

Figure 2:
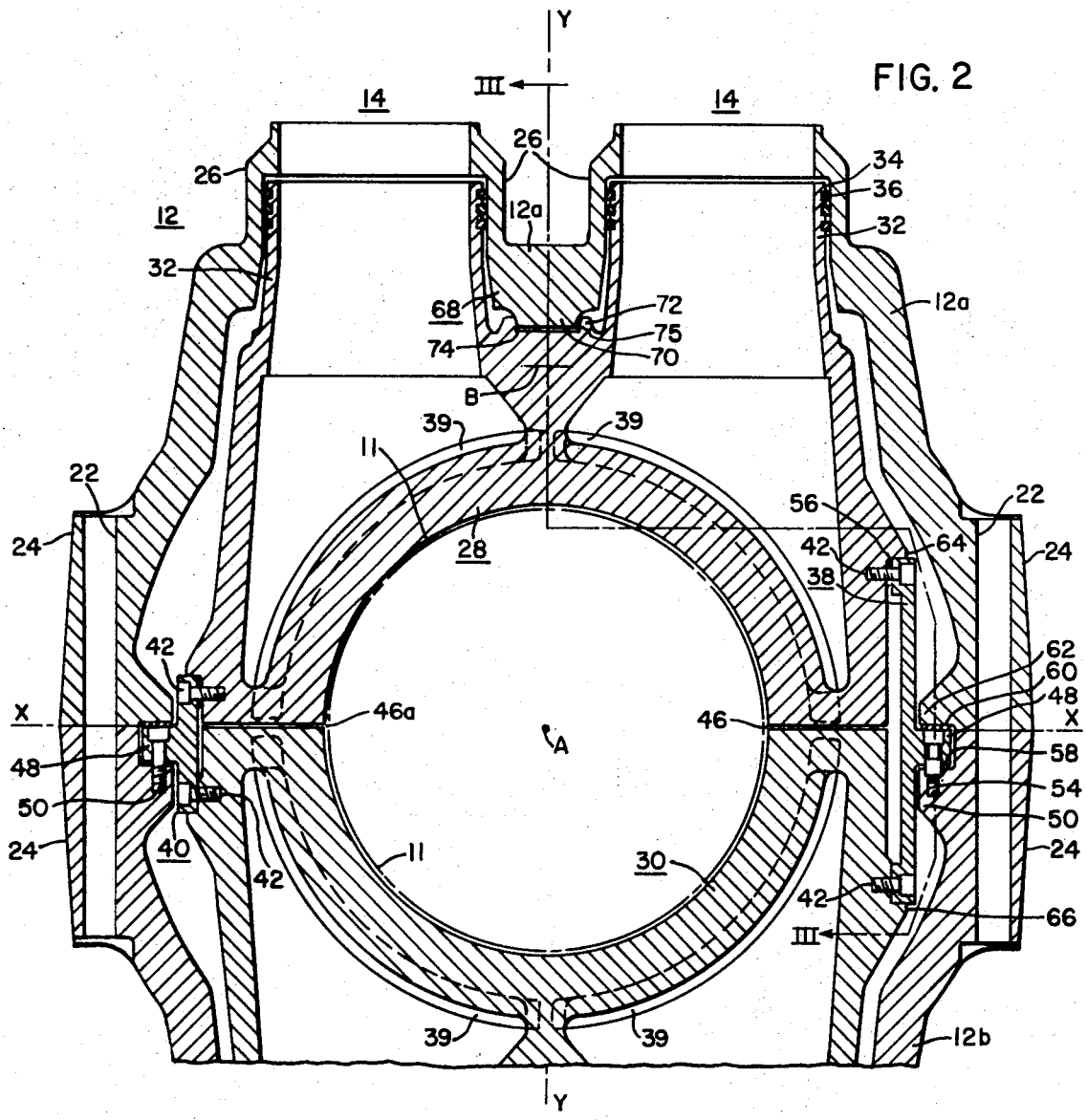
FIG. 2 is a view, in transverse section, taken along the line II—II in FIG. 1 showing the arrangement of two nozzle chambers within the turbine casing.

As shown more clearly in FIG. 2, the casing 12 is divided along a horizontal plane lying in the horizontal centerline X—X into an upper half 12a and a lower half 12b. The two halves may be secured together by any suitable means, such as bolts (not shown) extending through openings 22 in flanges 24 on the casing members. The shaft 11 rotates about the central axis A of the turbine. Each inlet opening 14 is generally circular in cross section and extends through an outwardly extending neck 26 which may be formed integrally with the casing 12. Suitable pipes (not shown) may be connected to the necks 26 to conduct the elastic fluid to the turbine.

As shown in FIG. 2, an upper nozzle chamber structure 28 and a lower nozzle chamber structure 30 are mounted inside the casing 12. The nozzle chamber structures 28 and 30 are disposed above and below the horizontal centerline X—X, respectively of the turbine. The upper chamber 28 has a pair of generally cylindrical nozzle sleeves 32 extending upwardly into the two inlet openings 14 in the upper half 12a of the casing. Likewise, the lower nozzle chamber 30 has a pair of nozzle sleeves extending downwardly into the openings 14 in the lower half 12b of the casing. Each sleeve 32 is slidably disposed in an enlarged portion 34 of an inlet opening 14 and metal seal rings 36 are provided in the sleeve 32 to prevent the elastic fluid from flowing between the outer wall of the sleeve 32 and the inner wall of the neck 26. The elastic fluid is admitted through arcuate passages 39 in the chambers 28 and 30 to the first stage blading of the turbine.

In order to permit differential thermal expansion to take place between the upper chamber 28, the lower chamber 30 and the casing 12, a support plate 38 is provided at the right-hand side of the chambers and a support plate 40 is provided at the left-hand side as viewed in FIG. 2. The plates 38 and 40 are of generally rectangular shape and extend across the horizontal centerline at substantially right angles thereto. As shown more clearly in FIG. 3, the plate 38 is attached to the upper chamber 28 by screws 42 and dowel screws 44. Likewise, the plate 38 is attached to the lower chamber 30 by screws 42 and dowel screws 44.

The plate 38 is so attached to the chambers 28 and 30 so that a small clearance 46 is provided between the chambers at the horizontal joint to provide for expansion between the points of attachment of the plate and the join between the two chambers. The plate 38 is relatively thin in cross-section and is relatively flexible as compared with the plate 40 for a reason which will be explained more fully hereinafter.

Figure 3:
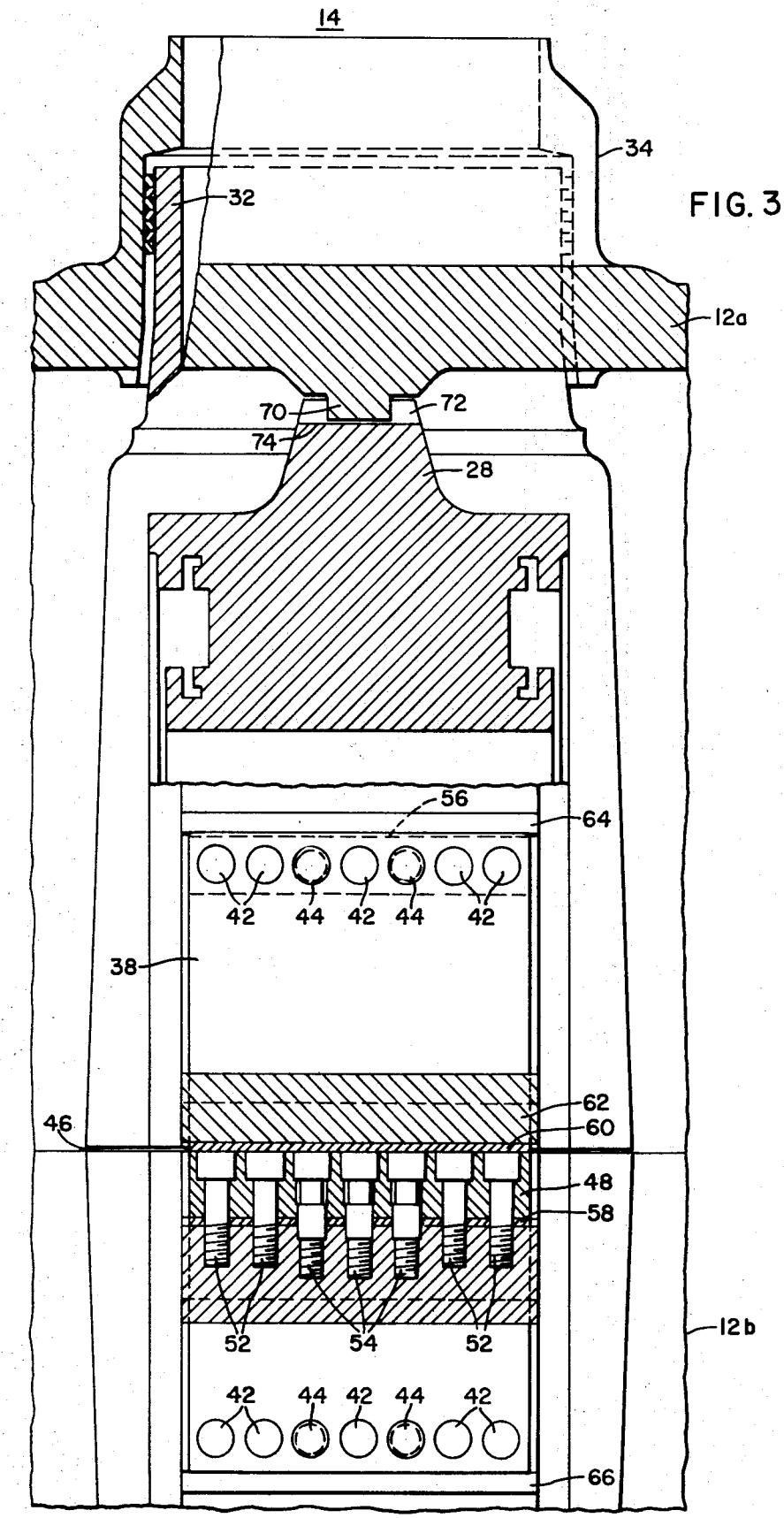
FIG. 3 is an enlarged view, in section, taken along the line III—III in FIG. 2.

A horizontally extending rib 48 is provided on the plate 38. The rib 48 rests upon a shoulder 50 on the lower half 12b of the casing and is attached to the shoulder by means of screws 52 and dowel screws 54 as shown in FIG. 3. A spacer plate 56 may be utilized to facilitate the fitting of the flexible plate 38 to the chamber 28. Likewise, a lower spacer plate 58 may be utilized between the rib 48 and the shoulder 50 to adjust the horizontal centerline of the chambers 28 and 30 with respect to the horizontal joint between the casing halves 12a and 12b. An upper spacer plate 60 may also be provided between the rib 48 and a downwardly facing shoulder 62 on the casing half 12a. The loading from the upper chamber 28 is transmitted to the flexible plate 38 by a downwardly facing shoulder 64 on the upper chamber 28 which engages the upper edge of the plate 38 and through the dowels 44 threaded into the chamber 28. Likewise, the load from the lower chamber 30 is transmitted to the plate 38 by an upwardly facing shoulder 66 which engages the lower edge of the plate 38 and through dowels 44 threaded into the lower chamber 30.

The support plate 40 is attached to the chambers 28 and 30 by screws 42 and dowel screws 44, in the same manner as the plate 38. A clearance 46a, equal to the clearance 46, is provided at the joint between the two chambers by the support plate 40. Likewise, a rib 48 on the plate 40 is attached to a shoulder 50 on the lower half 12b of the casing in the manner hereinbefore described. Thus, when viewed as in FIG. 2, the left-hand sides of the chambers 28 and 30 are supported in a manner generally similar to the right-hand sides.

The flexure of plate 38 in a direction transverse to its cross-section, permits relative movement due to thermal expansion to take place between the chamber 28 and the chamber 30, and between the two chambers 28 and 30 in the casing 12. Movement of the axial and horizontal centerlines of the nozzle chambers in a vertical direction and in an axial direction is prevented by the large section modulus of the flexible plate 38 in these directions.

The relative location of the vertical centerlines of the chambers 28 and 30 and the casing 12 is maintained by guide means 68 (only one shown) provided in the casing upper half 12a and in the lower half 12b between the inlet openings 14. The guide means 68 may comprise a dowel pin extending from the casing into an opening in the wall of the chamber, or, as shown in the present drawings, it may comprise a generally rectangular inwardly extending projection 70 on the casing which extends between two horizontally spaced outwardly extending projections 72 on the chamber. A clearance 74 is provided between the inner surface of the projection 70 on the casing 12a and the outer surface of the chamber 28 to permit vertical expansion of the chamber 28. The lower chamber 30 may be provided with similar guide means and thus need not be described.

A sliding fit is maintained between the projections 72 and the projection 70 of the guide means 68 by a small clearance 75. This clearance could permit vibration to take place between the casing 12 and the chambers 28 and 30 in a horizontal direction. To prevent this, the support plate 38 on one side of the chambers is constructed with greater flexibility than the support plate 40 on the opposite side of the chambers 28 and 30. When thermal expansion of the chambers takes place during operation of the turbine, there is a resulting constant bias or force indicated by the arrow B exerted on the side of each guide member 70 facing the support plate 40 which has the lesser amount of flexibility. The amount of force on the guide member can be varied by changing the relative flexibility of the two support plates 38 and 40. In this manner dampening of possible vibration between the nozzle chambers and the casing is provided.

An alternative to the foregoing arrangement is to construct the support 40 on one side of the vertical centerline so that it is rigid enough to prevent vibration, thereby anchoring the chambers to the casing at this point. The opposite support 38 would be made flexible enough to accommodate the differences of expansion that occur between the upper and lower chambers and the casing. The chambers would not then require anchoring at the vertical centerline, and any misalignment between these nozzle chambers and the rotor would be minimized by initially having the steam admitted to the upper and lower nozzle chambers adjacent to the flexible support.

From the foregoing description it is apparent that the invention provides a support arrangement for nozzle chambers of a turbine, or other elastic fluid machine, which fastens the chamber members together and to the casing of the turbine in a manner to permit differential thermal expansion to take place between the chamber members which are fastened together and between the chamber members and the turbine casing which supports the members, and also dampening any vibration in the chambers that could result from the elastic fluid excitation.

Since numerous changes may be made in the above-described construction, and different embodiments of the invention may be made without departing from the spirit and scope thereof, it is intended that all subject matter contained in the foregoing description or shown in the accompanying drawings shall be interpreted as illustrative and not in a limiting sense.

What we claim is:
1. In an elastic fluid turbine, in combination,
a turbine casing divided into an upper half and a lower half,
each half having at least one generally cylindrical inlet opening therein for elastic fluid,
an upper nozzle chamber and a lower nozzle chamber disposed inside the casing,
each chamber having a generally cylindrical nozzle sleeve extending into the inlet opening in the corresponding casing half,
a support plate located at one side of the chambers,
means for attaching said plate to said casing,
means for attaching said plate to both chambers at spaced points on said chambers so that said plate is flexible in directions to permit differential thermal expansion to take place between the two chambers and between the chambers and the casing.
2. The combination defined in claim 1, including
guide means in the casing cooperating with the chambers to maintain the relative location of the vertical centerlines of the chambers and the casing.
3. The combination defined in claim 2, wherein
each casing half has at least two inlet openings on opposite sides of said guide means, and
each chamber has a nozzle sleeve extending into each one of said inlet openings.
4. The combination defined in claim 1, wherein
said support plate is attached to the chambers in a manner to provide a clearance between the chambers at their horizontal joint.
5. The combination defined in claim 1, including
spacing means disposed between the support plate and at least one of said chambers.
6. The combination defined in claim 1, including
additional support means at the other side of the chambers for rigidly fastening the chambers together and to the casing.
7. In an elastic fluid turbine, in combination,
a turbine casing divided into an upper half and a lower half,
each half having at least one generally cylindrical inlet opening therein for elastic fluid,
an upper nozzle chamber and a lower nozzle chamber disposed inside the casing, each chamber having a generally cylindrical nozzle sleeve extending into the inlet opening in the corresponding casing half,
a support plate located at one side of the chambers,
means for attaching the plate to both chambers and to the casing,
said plate being flexible in a direction to permit differential thermal expansion to take place between the two chambers and between the chambers and the casing,
guide means in said casing cooperating with said chambers to maintain the relative location of the vertical centerlines of said chambers and said casing,
an additional support plate at the other side of said chambers,
means for attaching said additional plate to both of said chambers and said casing, and
said additional plate being less flexible than said first-named plate to cause a force to be exerted on said guide means when thermal expansion of said chambers takes place.

8. In an elastic fluid turbine, in combination,
a turbine casing divided into an upper half and a lower half,
each half having at least one generally cylindrical inlet opening therein for elastic fluid,
an upper nozzle chamber and a lower nozzle chamber disposed inside the casing,
each chamber having a generally cylindrical nozzle sleeve extending into the inlet opening in the corresponding casing half,
a support plate located at one side of the chambers,
means for attaching the plate to both chambers and to the casing,
said plate being flexible in a direction to permit differential thermal expansion to take place between the two chambers and between the chambers and the casing,
a horizontally extending rib on said plate,
a shoulder on the lower casing half supporting said rib, and
spacing means disposed between said rib and said shoulder.

References Cited
UNITED STATES PATENTS

| | | | |
|---|---|---|---|
| 2,651,495 | 9/1953 | Corbett | 253—39(C)(X) |
| 2,815,645 | 12/1957 | Downs | 253—39(C)(UX) |
| 2,888,240 | 5/1959 | Fleischmann | 253—39(C)(X) |
| 2,925,995 | 2/1960 | Hertl | 253—39(C) |
| 3,169,748 | 2/1965 | Howard et al. | 253—39(C) |

EVERETTE A. POWELL, Jr., Primary Examiner

U.S. Cl. X.R.

415—135, 219